No. 842,497.　　　　　　　　　　　　　　PATENTED JAN. 29, 1907.
G. A. RUSSELL, DEC'D.
M. C. RUSSELL, ADMINISTRATRIX.
MACHINE FOR GRINDING HORSESHOE CALKS.
APPLICATION FILED FEB. 11, 1905.

UNITED STATES PATENT OFFICE.

GEORGE A. RUSSELL, OF WORCESTER, MASSACHUSETTS; MARY C. RUSSELL ADMINISTRATRIX OF SAID GEORGE A. RUSSELL, DECEASED.

MACHINE FOR GRINDING HORSESHOE-CALKS.

No. 842,497.      Specification of Letters Patent.      Patented Jan. 29, 1907.

Application filed February 11, 1905. Serial No. 245,180.

*To all whom it may concern:*

Be it known that I, GEORGE A. RUSSELL, a citizen of the United States, residing at Worcester, in the county of Worcester and State of Massachusetts, have invented a new and useful Machine for Grinding Horseshoe-Calks, of which the following is a specification.

This invention relates to a construction for using an emery-wheel or similar abrading-wheel for sharpening horseshoe-calks without removing the shoes from the horse's hoofs.

The especial object of this invention is to improve the grinding mechanism which is disclosed in a prior application for patent, Serial No. 185,019, filed December 14, 1903, to provide greater flexibility in handling the grinder by using side handles which are pivotally connected to the casing, to reduce the friction by simple forms of ball-bearings, and to combine the grinding-shaft with an efficient form of flexible shafting, which may be inclosed in a casing connected in a simple and direct manner to the grinder-casing.

To these ends this invention consists of the grinder for sharpening horseshoe-calks and of the combinations of parts therein, as hereinafter described, and more particularly pointed out in the claims at the end of this specification.

Figure 1:
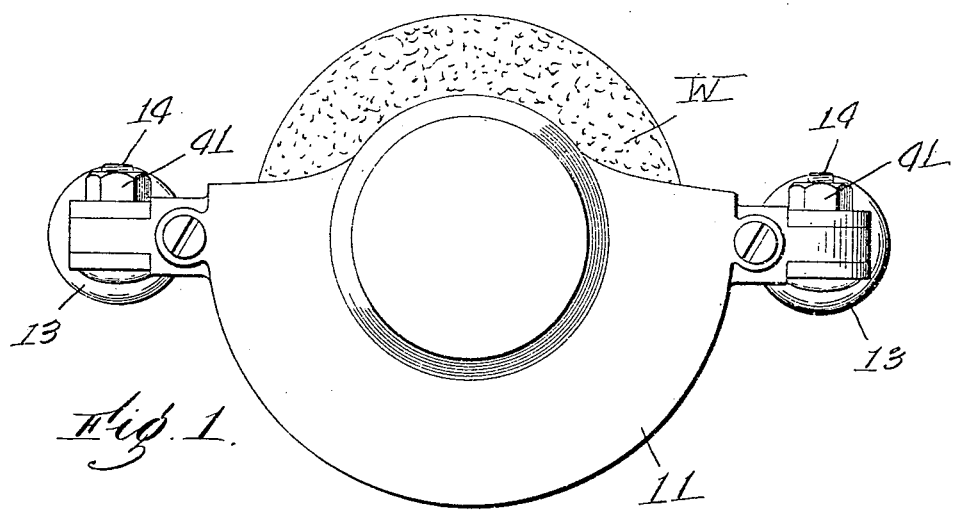
Figure 2:
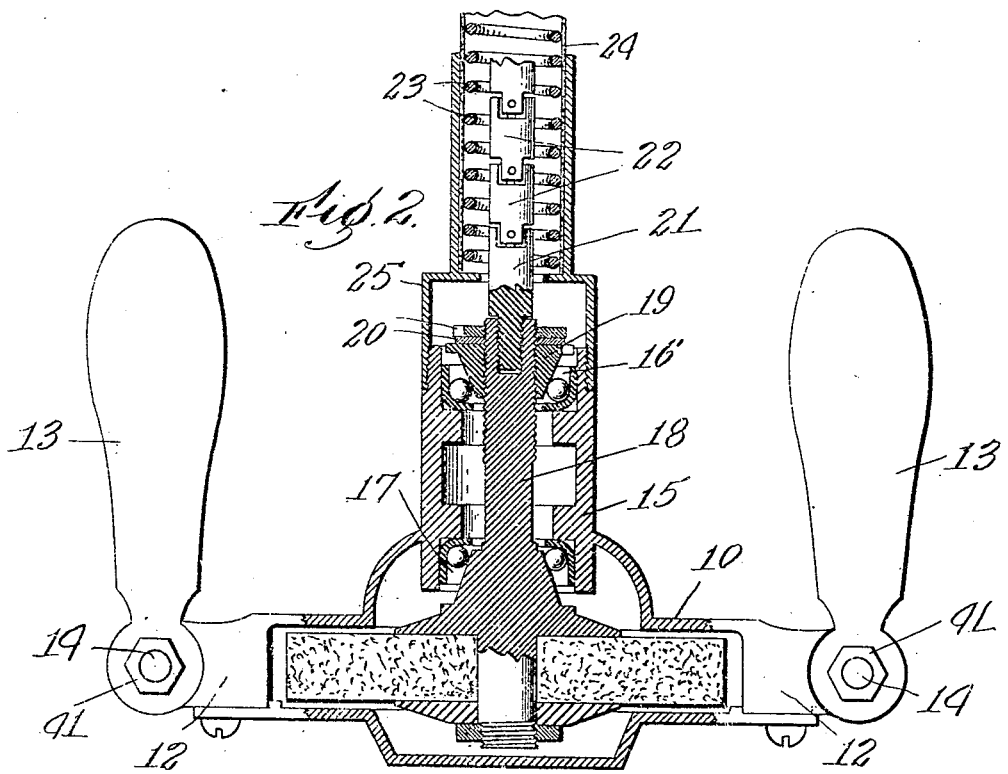

In the accompanying drawings, Figure 1 is a plan view of a grinder constructed according to this invention; and Fig. 2 is a side view thereof, partly in section.

In the use of that class of grinders to which this invention relates the user picks up the horse's hoofs one after the other, holding the same between the legs, as in horse-shoeing, leaving both hands free to use the grinder. I have found in practice that by pivoting the oppositely-disposed handles to the casing the grinder may be handled with greater ease and flexibility than in my previous constructions, in which the handles are rigid.

Referring to the accompanying drawings and in detail, a grinder for horseshoe-calks as herein illustrated comprises a casing which is substantially segmental in shape. Fastened to the casing 10 is a corresponding segmental cover 11. Extending from diametrically opposite sides of the casing are ears 12, and the handles 13 are each provided with a fork, which straddles one of the ears 12, each handle being pivoted on a transverse bolt 14, which is fastened by a nut 41.

By tightening the nuts 41 the friction of the handle-joints can be adjusted as desired, and the handles can be locked or fastened at different inclinations or can be allowed to work somewhat freely, so as to permit the flexible and easy handling of the grinder.

Extending centrally from the segmental casing is a hollow stem 15, and secured in the hollow stem 15 are ball-casings 16 and 17. The shaft 18, which carries the grinding-wheel W, is provided with one fixed cone cooperating with the set of balls running in the ball-casing 17. At its opposite end the shaft 18 is screw-threaded and provided with an adjustable ball-cone 19, coöperating with the set of balls running in the ball-casing 16. The adjustable cone 19 is locked in place by the adjusting-nuts 20. Threaded into the end of the grinder-shaft 18 is a stud forming part of the initial link 21 of the flexible shafting. Each of the ordinary links 22 of the flexible shafting is provided with a cross-pin, which extends across transversely to the pin of the next succeeding link. The links 22 of the flexible shafting are inclosed within a spiral spring 23, and the entire construction may have an outside covering 24, which is provided at its end with a fitting 25, which screws onto the stem 15 of the grinder-casing.

In the use of a complete grinder as thus constructed the grinding-shaft will run with comparatively little friction and a direct and simple connection will be provided with the flexible shafting, the links of the shafting being directly connected to the grinder-shaft, while the shafting-casing is connected by a fitting to the grinder-casing.

I am aware that changes may be made in the details of the construction of my grinder and that certain features thereof may be omitted if desired. I do not wish, therefore, to be limited to the construction I have herein shown and described, but What I do claim, and desire to secure by Letters Patent of the United States, is—

1. As an article of manufacture, a portable grinding device comprising a segmental casing, a shaft journaled near one side of and supported by said casing, and a grinding-wheel mounted on said shaft, the edge of said grinding-wheel projecting laterally from the casing.

2. As an article of manufacture, a portable grinding device comprising a segmental casing, a shaft journaled near one side of said casing and supported thereby in bearings, a grinding-wheel mounted on said shaft, the principal part of said grinding-wheel being inclosed within the casing, the operating edge of the wheel projecting laterally from the casing, and handles mounted on said casing on the opposite sides of the shaft for supporting the casing.

3. In a grinding device, the combination of a casing consisting of a front plate and a rear plate, said plates being of a general circular form with one side removed, a shaft journaled on said plates adjacent to the cut-away portions thereof, a grinding-wheel mounted on said shaft and located mainly within the casing and projecting therefrom on the cut-away side thereof, and a pair of adjustable handles connected with said casing for supporting it at opposite sides of said shaft.

4. In a grinding device, the combination of a casing consisting of a front plate and a rear plate, said plates being of a general circular form with one side removed, a shaft journaled in the casing and adjacent to the cut-away portion thereof, a grinding-wheel mounted on said shaft and located mainly within the casing and projecting therefrom on the cut-away side thereof, and a pair of antifriction-bearings for said shaft located on the casing, said bearings comprising a cone adjustable along the shaft to take up wear.

In testimony whereof I have hereunto set my hand in the presence of two subscribing witnesses.

GEORGE A. RUSSELL.

Witnesses:
PHILIP W. SOUTHGATE,
LOUIS W. SOUTHGATE.